United States Patent
Chino et al.

(10) Patent No.: US 6,261,182 B1
(45) Date of Patent: Jul. 17, 2001

(54) COUPLER APPARATUS FOR ROTATION SENSOR

(75) Inventors: Kenji Chino; Masaya Hyodo; Yoshihisa Iwanaga; Kazuo Ishikawa, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/403,890

(22) PCT Filed: May 11, 1998

(86) PCT No.: PCT/JP98/02074

§ 371 Date: Oct. 27, 1999

§ 102(e) Date: Oct. 27, 1999

(87) PCT Pub. No.: WO98/51996

PCT Pub. Date: Nov. 19, 1998

(30) Foreign Application Priority Data

May 14, 1997 (JP) .................................................. 9-124176

(51) Int. Cl.$^7$ ............................................................. F16D 3/52
(52) U.S. Cl. ................................. 464/89; 464/78; 464/51; 464/100; 403/306
(58) Field of Search ..................................... 464/51, 78, 89, 464/100; 403/221, 223, 294, 292

(56) References Cited

U.S. PATENT DOCUMENTS

| | | | |
|---|---|---|---|
| 3,878,695 | * 4/1975 | Pitner | 464/89 |
| 4,121,476 | 10/1978 | Hammond . | |
| 4,691,818 | * 9/1987 | Weber | 198/666 |
| 5,152,631 | 10/1992 | Bauer . | |
| 6,079,110 | * 6/2000 | Chino et al. | 33/203.18 |

FOREIGN PATENT DOCUMENTS

| | | |
|---|---|---|
| 3339470 A1 | 5/1985 | (DE) . |
| 0 178 694 A2 | 4/1986 | (EP) . |
| 0 519 816 A1 | 12/1992 | (EP) . |
| 63-3216 | 1/1988 | (JP) . |
| 63-135111 | 9/1988 | (JP) . |
| 3-209126 | 9/1991 | (JP) . |
| 4-157314 | 5/1992 | (JP) . |
| 5-55768 | 7/1993 | (JP) . |
| 62-132422 | 8/1997 | (JP) . |
| 10310077 | * 11/1998 | (JP) . |
| 10311738 | * 11/1998 | (JP) . |

OTHER PUBLICATIONS

EP 98 91 9549 Search Report dated Aug. 1, 2000.

Orthwein, W., Machine Component Design, West Publication Company, (1989), Chapter 8, pp. 483–485.

* cited by examiner

Primary Examiner—Lynne H. Browne
Assistant Examiner—Aaron M Dunwoody
(74) Attorney, Agent, or Firm—Woodcock Washburn Kurtz Mackiewicz & Norris LLP

(57) ABSTRACT

An installation structure of a rotation detector for detecting a rotation amount of a rotational shaft such as a kingpin. The installation structure prevents wear and damage to an input shaft of the rotation detector caused by a radial force applied to the input shaft and has high detection accuracy by eliminating slack between the rotational shaft and the input shaft. The rotation detector is fixed to a support member rotatably supporting the rotational shaft such that the input shaft is substantially coaxial with the rotational shaft. The input shaft is coupled to the rotational shaft through a rotation transmitting means. The rotation transmitting means permits the axis of the input shaft to be offset from the axis of the rotational shaft and limits relative rotation between the input shaft and the rotational shaft. When the axis of the input shaft is offset from the axis of the rotational shaft, the radial force applied to the input shaft from the rotational shaft is absorbed and mitigated, and the rotation of the rotational shaft is transmitted to the input shaft without loss.

18 Claims, 15 Drawing Sheets

COUPLER APPARATUS FOR ROTATION SENSOR

BACKGROUND OF THE INVENTION

The present invention relates to a coupler apparatus for a rotation sensor for detecting rotation of a rotating shaft such as a kingpin in vehicles.

Generally, in forklifts, pivoting of a rear axle is limited so that the vehicle body does not incline excessively from centrifugal force when turning. The pivoting of the rear axle is controlled according to, for example, the velocity of the vehicle and the steering angle. Japanese Examined Patent Publication No. 4-24270 describes a method for detecting the steering angle. In this publication, a displacement sensor attached to a steering cylinder detects the piston displacement, and the steering angle is calculated from the displacement. However, using this method, it is difficult to obtain the steering angle. Therefore, the present applicant devised a potentiometer located on an upper bracket of an axle beam for detecting the pivoting angle of a kingpin and for obtaining the steering angle from the detected pivoting angle.

As shown in FIG. 21, a potentiometer 52 for detecting the rotation of the kingpin 10 is mounted on the upper bracket 51 supporting a kingpin 50 in a rear axle beam. The potentiometer 52 is fixed to the upper bracket 51 through a sensor support plate 54 so that the potentiometer 52 is located above a bearing hole 53 in which the kingpin 50 is supported. The potentiometer 52 is fixed to the support late 54 by screws (not shown), and the support plate 54 is fixed to an upper bracket 51 by bolts (not shown). An input shaft 55 of the potentiometer 52 passes through the through hole 54a toward the kingpin 50, and a body 56 of the potentiometer 52 is fixed to the support plate 54. The axis of the input shaft 55 is aligned with the axis of the kingpin 50. A coupling portion 55a, the cross section of which is D-shaped, is formed at the distal end of the input shaft 55, and the coupling portion engages a D-shaped coupling hole 57 in the upper end of the kingpin 50. This prevents relative rotation between the input shaft 55 and the kingpin 50.

Dimensional inaccuracy of parts occurs, and this may offset the axis of the input shaft 55 from the axis of the kingpin 50. Roller bearings wear after a long period of use, and this may cause the axis of the kingpin 50 to shift from the original position at the center of the bearing hole 53. This may also offset the axis of the input shaft 55 from the axis of the kingpin 50. As a result, a radial force is applied from the kingpin 50 to the input shaft 55, which may degrade the detection sensitivity and durability of the potentiometer 52. If the radial force becomes excessive, the potentiometer 52 may be damaged.

It is possible to prevent the input shaft 55 from receiving the radial force from the kingpin 50 by providing a clearance between the kingpin 50 and the input shaft 55. However, this may cause slack between the input shaft 55 and the kingpin 50 in the rotational direction and may degrade detection sensitivity.

SUMMARY OF THE INVENTION

An objective of the present invention is to provide an installation structure for a rotation detector that prevents application of a radial force to an input shaft and slack between a rotational shaft and the input shaft, thus improving durability and detection sensitivity of the rotation detector.

To achieve the objective, the present invention provides an coupler apparatus for a rotation detector, wherein the rotation detector is fixed to a support member supporting the rotational shaft such that an input shaft of the rotation detector is coupled to and does not rotate with respect to the rotational shaft and such that the axis of the input shaft is substantially aligned with the axis of the rotational shaft. The coupler apparatus is characterized in that the input shaft is coupled to the rotational shaft through a rotation transmitter that permits misalignment of the axis of the input shaft from the axis of the rotational shaft by elastic deformation while limiting relative rotation of the input shaft with respect to the rotational shaft.

The input shaft of the rotation detector is coupled to the rotational shaft through the rotation transmitter such that relative rotation of the input shaft with respect to the rotational shaft is prevented and the axis of the input shaft is substantially aligned with the axis of the rotational shaft. When the axis of the input shaft is offset from the axis of the rotational shaft, the rotation transmitter is elastically deformed, which permits the misalignment while limiting relative rotation between the input shaft and the rotational shaft. Accordingly, when the axis of the input shaft is offset from the axis of the rotational shaft, radial force applied from the rotational shaft to the input shaft is absorbed and reduced, and the rotation of the rotational shaft is transmitted to the input shaft. This prevents wear and damage caused by radial force and also prevents slack between the input shaft and the rotational shaft in the rotational direction, which improves detection accuracy.

The rotation transmitter includes a coupling recess located at an end of either the rotational shaft or the input shaft, and a coupling shaft is located at an end of the other shaft. The coupling shaft is placed in the coupling recess, and an elastic coupler that elastically couples the coupling recess with the coupling shaft connects the two together.

The elastic coupler, which couples the coupling recess, which is located in one end of the rotational shaft or the input shaft, with the coupling shaft, which is located at an end of the other shaft, permits misalignment of the coupling recess from the coupling shaft and limits relative rotation of the coupling recess to the coupling shaft. This simplifies the structure and reduces the number of parts and installation steps.

In one embodiment, the elastic coupler includes an engaging portion that integrally rotates with the coupling recess and an elastic member having a fitting portion in which the coupling shaft is inserted to integrally rotate with the elastic member.

The elastic member is coupled to the coupling recess to integrally rotate with the coupling recess by engagement of the engaging portion of the elastic member with the coupling recess. Similarly, the elastic member is coupled to the coupling shaft to integrally rotate with the coupling shaft by engagement of the coupling shaft with the fitting portion of the elastic member. Accordingly, the elastic member, which engages the coupling shaft and the coupling recess, respectively, to integrally rotate with them, limits relative rotation between the input shaft and the rotational shaft and permits misalignment of their axes by elastic deformation. The elastic coupler is made of elastic material that is easy to form.

The coupling recess may be located in the end of the rotational shaft, and the coupling shaft may be located at the end of the input shaft. In this case, the coupling shaft and the coupling recess are easily machined.

In one embodiment, the coupling recess includes first and second columnar holes. The first columnar hole is coaxial with the rotational shaft, and the axis of the second columnar hole is parallel to the axis of the first columnar hole. The engaging portion of the elastic member includes a first body corresponding to the first hole and a second body corresponding to the second hole. In this case, the coupling recess stops relative rotation. Only one drilling is necessary for forming each of the first and second holes, which reduces time spent for machining the coupling recess.

The cross section of the coupling shaft may be D-shaped, and the fitting portion of the elastic member may be a D-shaped engaging hole that passes through the first body. In this case, an existing rotation detector, the coupling shaft of which has a D-shaped cross section, can be used.

When the elastic member is made of synthetic rubber, formation of the elastic member is easier.

In one embodiment, a tapered portion for guiding the elastic member into the coupling recess is provided on one of the opening end of the coupling recess and the lower end of the elastic member. In this structure, when the elastic member is fitted into the coupling recess, the tapered portion guides the elastic member into the coupling recess. Accordingly, the elastic member is more easily fitted in the coupling recess.

In one embodiment, the elastic coupler is made of rubber and includes a body and a fitting portion. The body fits in and integrally rotates with the coupling recess of the rotational shaft. The fitting portion receives and integrally rotates with the coupling shaft. The fitting portion has a deformation preventing member on the inner surface of a hole in the body. The deformation preventing member is cylindrical with a slit and is made of a plate of hard material.

In this embodiment, since the deformation preventing member is attached to the rubber of the body by fusion, the torque transmitted from the elastic coupler to the input shaft is received over an entire contact surface, which reduces the deformation of the rubber from torsion. Accordingly, when the direction of rotation is frequently changed, the durability of the elastic coupler is improved.

The deformation preventing member may be made of a stainless steel plate and may be integrally molded with the body by insert molding. In this case, there is no need to attach the deformation preventing member to the body later, and the member is rustproof and durable.

In another embodiment, the elastic coupler is a spring. The ends of the spring are supported by the rotational shaft to extend in parallel with a plane that includes the axis of the rotational shaft in the coupling recess, and are coupled to the coupling shaft to relatively move in a direction of the line connecting the ends.

In this embodiment, the spring, in the coupling recess, extends in a direction parallel to a plane that includes the axis of the rotational shaft and limits relative rotation between the rotational shaft and the coupling shaft. When the axis of the rotational shaft is misaligned with the axis of the coupling shaft in the longitudinal direction of the spring, the misalignment is permitted by the relative movement between the spring and the coupling shaft. When, misalignment of the axes occurs in a direction angular to the longitudinal direction of the spring, the misalignment is permitted by the elastic deformation of the spring. This elastic coupler is more durable than to one made of rubber.

In another embodiment, the spring is angular to the axis of the rotational shaft and is inserted in an inserting portion formed in the coupling shaft. In this case, the spring is received in the inserting portion, thus ensuring the coupling of the spring to the coupling shaft.

In another embodiment, the inserting portion is a through hole formed in the coupling shaft, and the spring is supported by a pair of engaging grooves formed in the rotational shaft. In this embodiment, during installation, the coupling shaft is moved toward the engaging grooves with the spring inserted in the through hole of the coupling shaft. Then, the spring engages the engaging grooves. Accordingly, the spring is easily replaced.

In another embodiment, a pair of the springs are provided. The coupling shaft is held between a rotation stopping portion to prevent rotation. This facilitates machining the input shaft.

The spring may be supported by a pair of engaging holes respectively formed in the rotational shaft.

Also, the spring may be supported by a pair of engaging grooves respectively formed in the rotational shaft. In this case, the spring is more easily replaced compared to the structure in which the spring is supported by the engaging holes.

In another embodiment, the rotation stopping portion formed in the coupling shaft of the input shaft is held between the springs to prevent the rotation. In this case, an existing potentiometer can be used as a rotation detector.

Bar springs or leaf springs are used as the springs. When a leaf spring is used, the spring force is easily altered by changing the spring.

In another embodiment, the rotational shaft is a kingpin, which is provided in the rear axle beam of a forklift to support the steered wheels.

In this embodiment, the rotation detector is provided in the rear axle beam of the forklift to detect the rotation amount of the kingpin. A radial force applied to the input shaft of the rotation detector from the kingpin does not shorten the life of the potentiometer. Slack between the kingpin and the input shaft is prevented, which improves the accuracy of detection.

DETAILED DESCRIPTION OF THE PREFERRED EMBODIMENTS

First Embodiment

A coupler apparatus for a rotation detector 21, which detects rotation of a kingpin 15 of a rear axle beam of a forklift according to a first embodiment of the present invention will now be described with reference to FIGS. 1–5.

Figure 2:
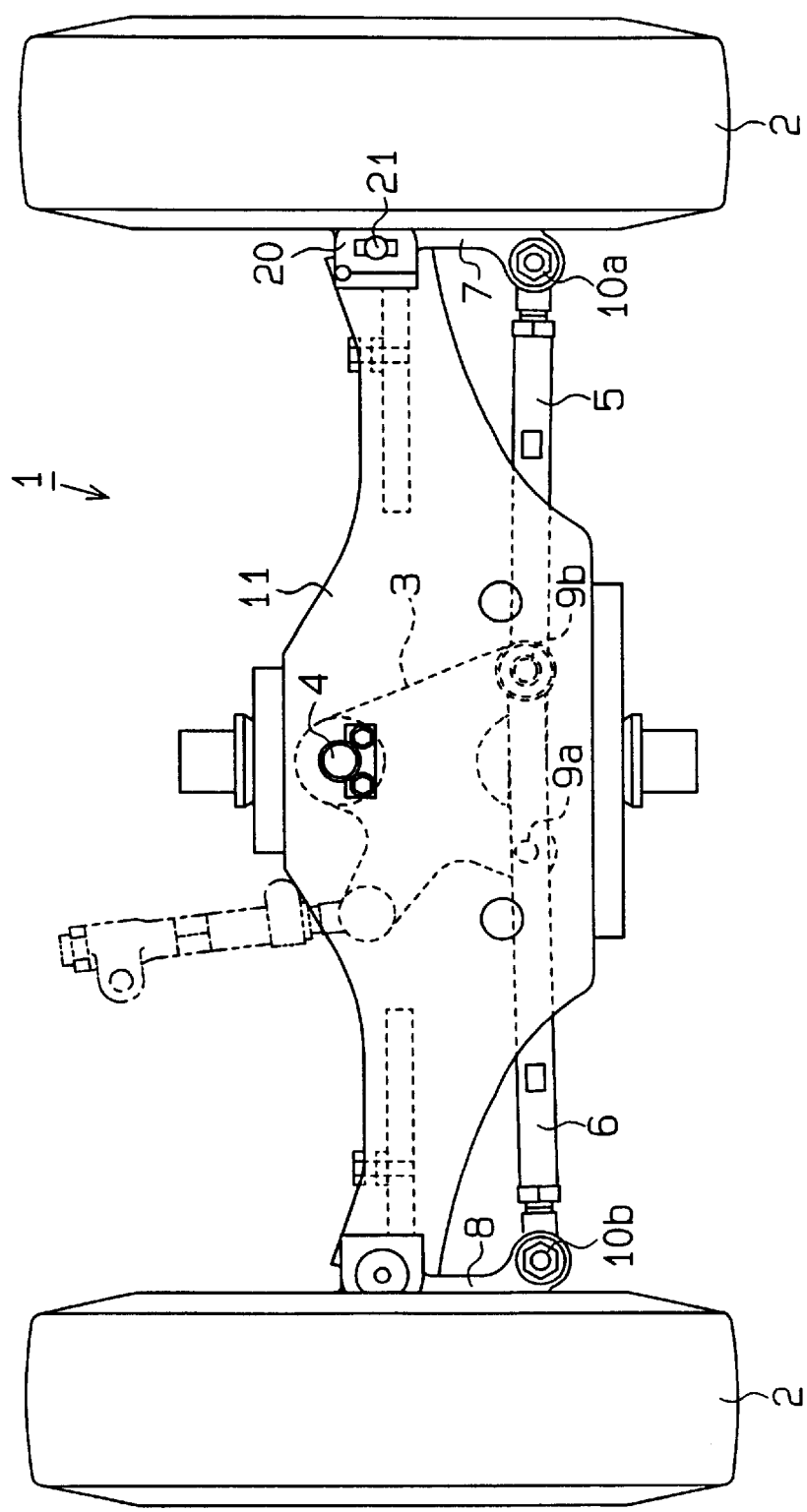
FIG. 2 is a plan view showing steered wheels supported by a rear axle beam of a forklift.

As shown in FIG. 2, a bell crank 3 is rotatably supported in a rear axle beam 1 of a forklift by a bell crank pin 4. The bell crank 3 steers wheels 2 based on the operation of the steering wheel (not shown). Steering knuckles 7, 8 are provided at both ends of the rear axle beam 1 to support the wheels 2. The bell crank 3 is coupled to the steering knuckles 7, 8 through a pair of steering rods 5, 6. A first end of the steering rod 5 is rotatably coupled to the coupler pin 9a, which is secured to the bell crank 3. A second end of the steering rod 5 is rotatably coupled to a coupler pin 10a, which is secured to the steering knuckle 7. A first end of the steering rod 6 is rotatably coupled to the coupler pin 9b that is secured to the bell crank 3. A second end of the steering rod 6 is rotatably coupled to a coupler pin 10b that is secured to the steering knuckle 8.

Figure 3:
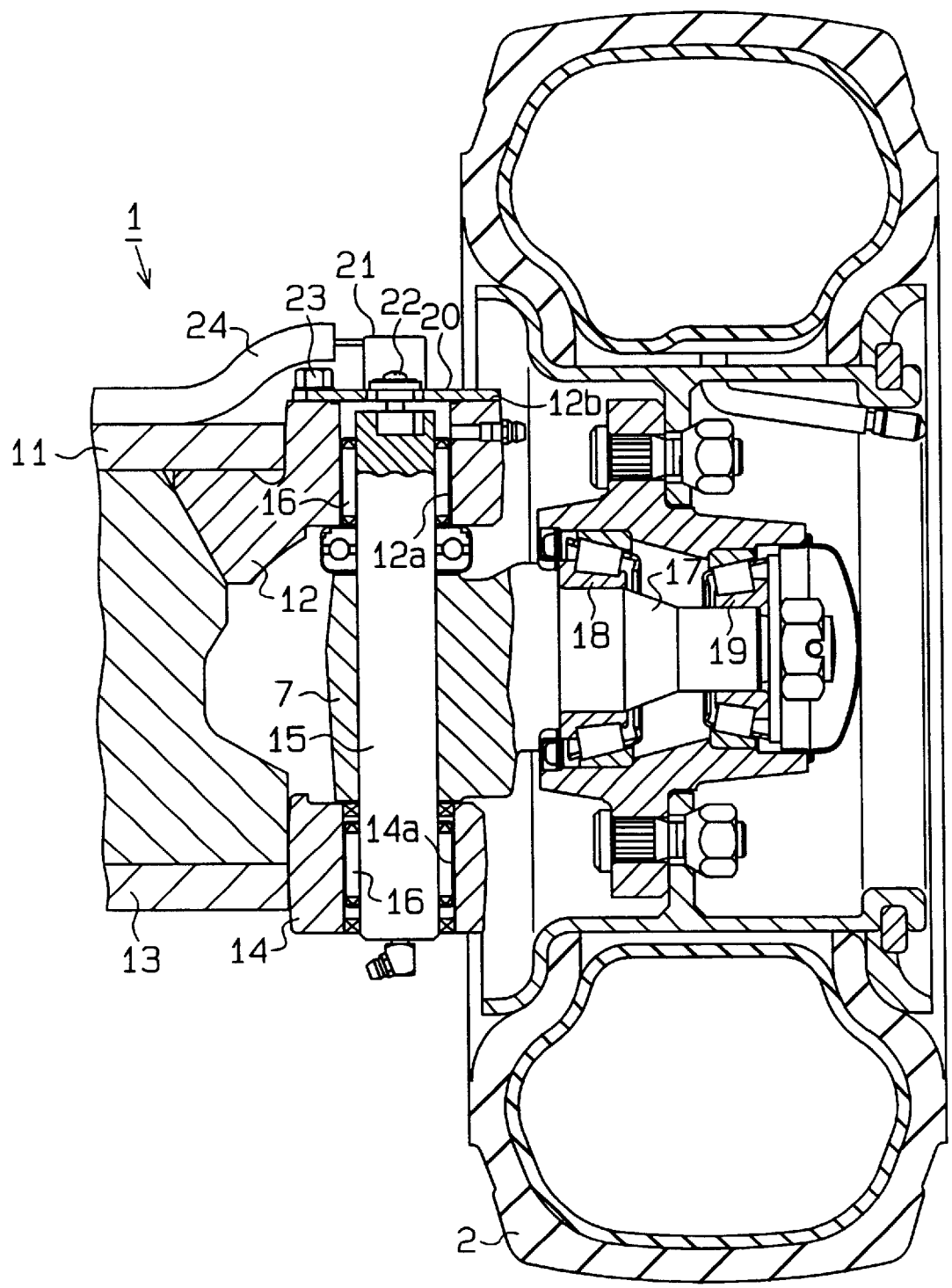
FIG. 3 is a partial cross sectional view of the rear axle beam.

FIG. 3 shows one of the wheels 2 supported by the rear axle beam 1. An upper bracket 12, which is a support member, is secured to an upper beam 11 of the rear axle beam 1, and a lower bracket 14 is secured to a lower beam 13. A bearing hole 12a vertically passes through the upper bracket 12, and a bearing hole 14a vertically passes through the lower bracket 14. The kingpin, or operating shaft 15, which is a rotational shaft, is rotatably supported in the bearing holes 12a, 14a through needle bearings 16. The steering knuckle 7 is secured to and integrally rotates with the kingpin 15. The wheels 2 are rotatably supported by a shaft 17 of the steering knuckle 7 through tapered roller bearings 18, 19.

As shown in FIG. 3, a potentiometer 21, which is a rotation detector, is installed on an upper surface 12b of the upper bracket 12 through a sensor support plate 20. The potentiometer 21 is fixed to the support plate 20 by screws 22. The support plate 20 is fixed to the upper surface 12b of the upper bracket 12 by a bolt 23. A lead wire 24 is connected to the potentiometer 21.

Figure 1:
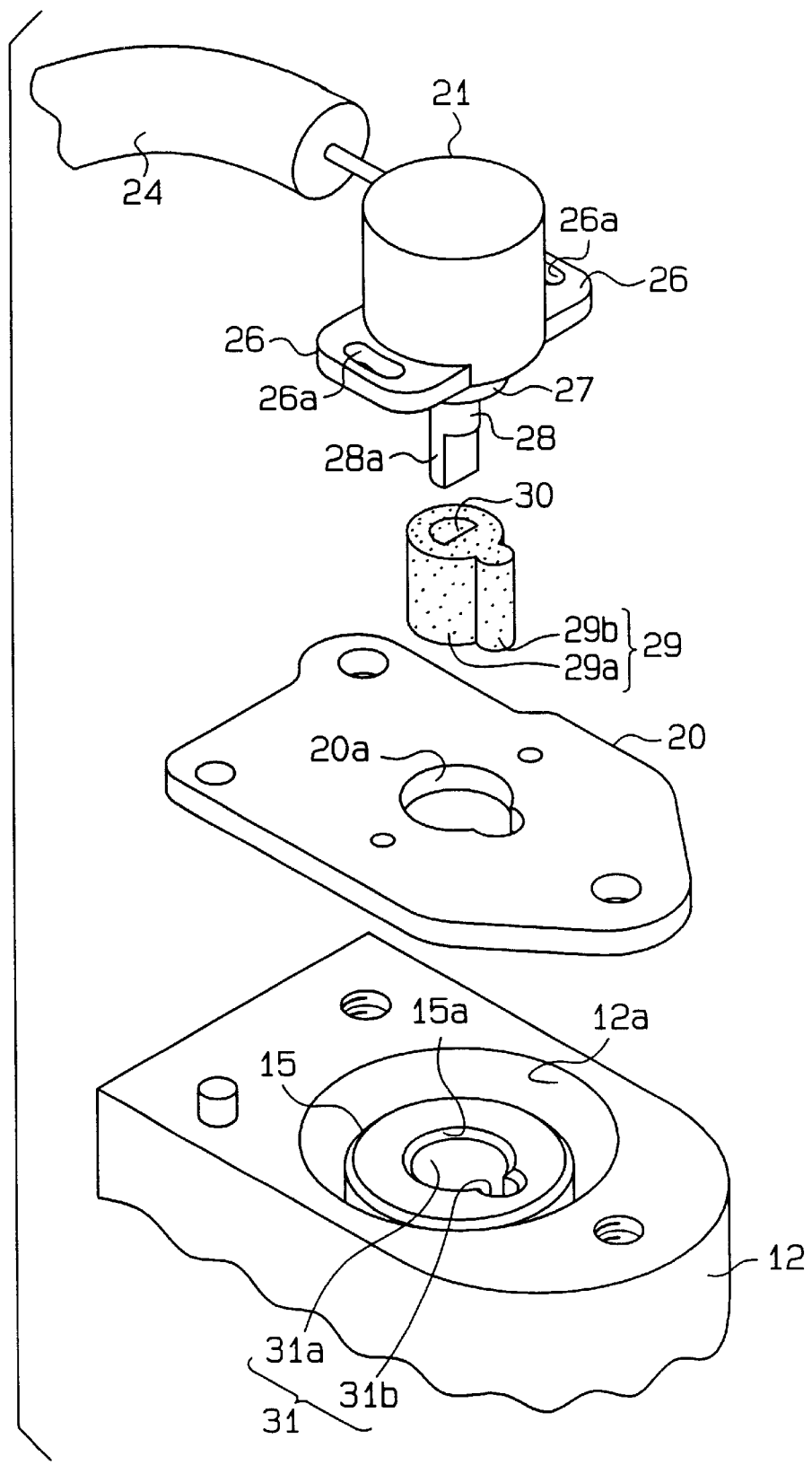
FIG. 1 is an exploded perspective view showing an coupler apparatus for a rotation detector according to a first embodiment of the present invention.
Figure 4:
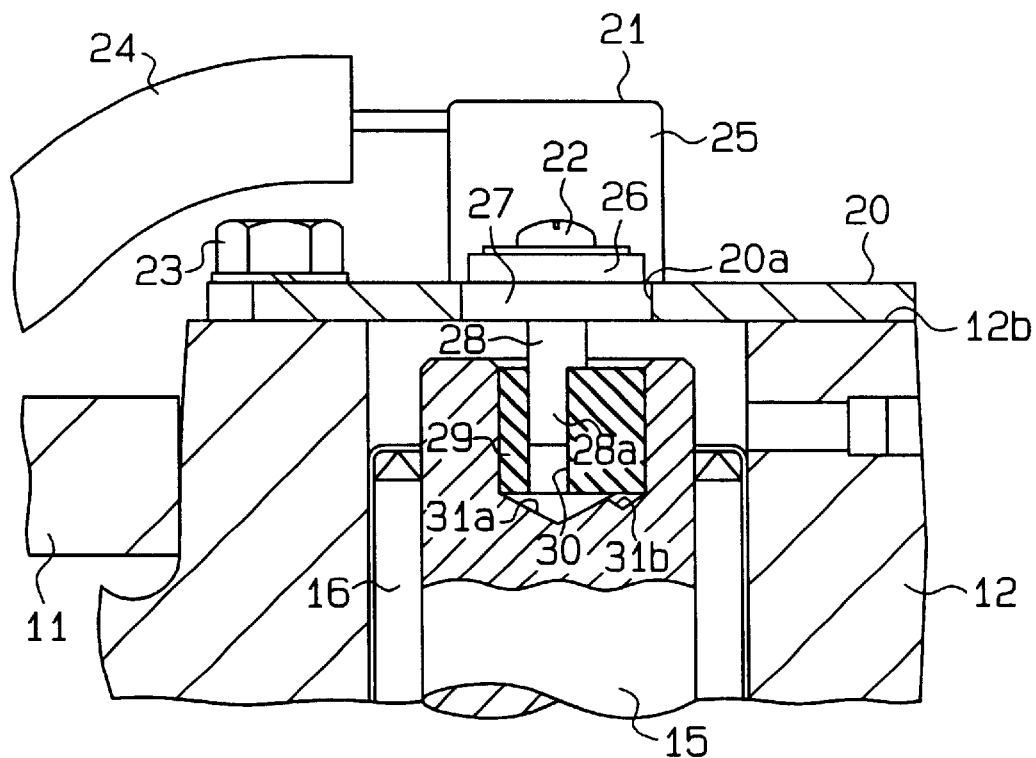
FIG. 4 is a partial cross sectional view showing the coupler apparatus of FIG. 1.

The support member 20 is, for example, a die-cast plate. As shown in FIGS. 1 and 4, an attachment hole 20a is formed at the center of the support plate 20.

As shown in FIGS. 1 and 4, the potentiometer 21 includes a columnar body 25, attachments 26 located on both sides of the body 25, a lower end 27 projecting from the lower surface of the body 25, and an input shaft 28 projecting from the lower surface of the lower end 27. The lower end 27 is placed in the attachment hole 20a. An elongated hole 26a is formed in each attachment 26 so that the body 25 is fixed on the support plate 20 by screws 22. The distal end of the input shaft 28 includes a coupling shaft 28a. In this embodiment, the cross section of the coupling shaft 28a is D-shaped. A bushing 29, which is an elastic coupler, or an elastic member, is fitted on the coupling shaft 28a. The bushing 29 is, for example, made of synthetic rubber. The bushing 29 includes a first body (large radius body 29a) and a second body (small radius body 29b). The large radius body 29a is coaxial with the input shaft 28, and the axis of the small radius body 29b is parallel to the axis of the large radius body 29a. The bushing 29 is shaped like the union of two intersecting cylinders, the axes of which are parallel. An engaging hole 30 vertically passes through the center of the large diameter body of the bushing 29. The engaging hole 30 receives the coupling shaft 28a. When the coupling shaft 28a is engaged with the engaging hole 30, the large radius body 29a is coaxial with the input shaft 28. In this embodiment, an engaging portion of the bushing 29 includes the large radius body 29a and the small radius body 29b, and a fitting portion includes the engaging hole 30.

A coupling hole 31, which is a coupling recess, is formed in the upper end of the kingpin 15. The bushing 29 engages the coupling hole 31. The coupling hole 31 includes a first columnar hole (large radius hole 31a) and a second columnar hole (small radius hole 31). The large radius hole is coaxial with the kingpin 15. The axis of the small radius hole 31b is parallel to the axis of the large radius hole 31a. The large radius body 29a engages the large radius hole 31a, and the small radius body 29b engages the small radius hole 31b. A tapered portion 15a is formed at the opening of the coupling hole 31.

Figure 5:
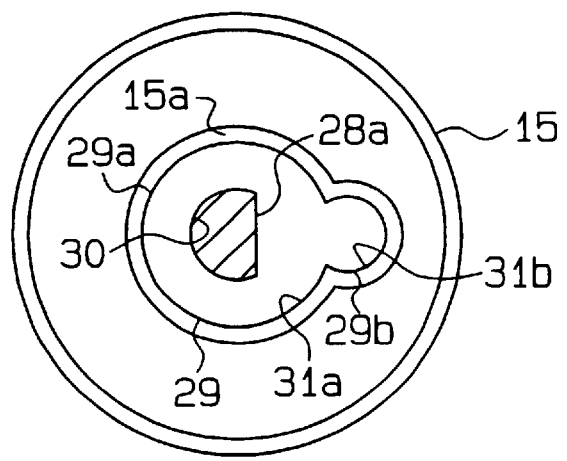
FIG. 5 is a cross sectional and an input shaft of the apparatus of FIG. 1 plan view of a kingpin.

As shown in FIGS. 4 and 5, the potentiometer 21 is coupled to the kingpin 15 through the bushing 29. The bushing is attached to the input shaft 28 and fitted in the coupling hole 31. In this embodiment, the coupling shaft 28a, the bushing 29 and the coupling hole 31 constitute a rotation transmitting means.

Operation of

Since the coupling hole 31 is a combination of the large radius hole and the small radius hole, the coupling hole 31 is formed by one drilling for each hole 31a, 31b.

When installing the potentiometer 21 on the upper bracket 12, the bushing 29 is attached to the coupling shaft 28a and is fitted in the coupling hole 31 through the attachment hole 20a of the support plate 20. During the installation, even when the axis of the input shaft 28 is offset from the axis of the kingpin 15, the tapered portion 15a of the opening of the coupling hole 31 guides the bushing 29 into the coupling hole 31. As a result, the input shaft 28 is coupled to the kingpin 15 through the bushing 29 to rotate integrally with the kingpin 15.

When the bell crank 3 is operated by the steering wheel (not shown) after the installation of the potentiometer, the steering knuckles 7, 8 are operated through the steering rods 5, 6. The wheels 2 are steered by a steering angle based on the rotation amount of the steering wheel. The rotation amount of the kingpin 15 corresponds to the steering angle, and the input shaft 28 rotates the same amount.

When the input shaft 28 is coaxial with the kingpin 15, the kingpin 15 rotates without applying a bending moment to the input shaft 28. The rotation of the kingpin 15 is transmitted to the input shaft 28 through the bushing 29, which rotates the input shaft 28 as much as the kingpin 15. Then, the potentiometer 21 detects the rotational angle of the kingpin 15.

When the axis of the input shaft 28 is offset from the axis of the kingpin 15 because of dimensional inaccuracy or displacement of the kingpin resulting from the wear of the needle bearings 16, the bushing 29 elastically deforms and allows misalignment between the input shaft 28 and the kingpin 15. At this time, a radial force is applied to the input shaft 28 from the kingpin 15 through the bushing 29. Accordingly, the radial force applied to the input shaft is absorbed by the elastic deformation of the bushing 29.

In this state, the rotation of the kingpin 15 is transmitted to the input shaft 28 through the deformed bushing 29. At this time, since there is no clearance between the input shaft 28 and the kingpin 15, the rotation of the kingpin 15 is transmitted to the input shaft 28 without any loss. Accordingly, the actual rotational angle of the kingpin 15 is detected by the potentiometer 21.

This embodiment has the following advantages.

(1) The input shaft 28 is connected to the rotational shaft (kingpin 15) by an elastic coupler (bushing 29), which permits misalignment between the axis of the input shaft 28 and the axis of the rotational shaft due to its elastic deformation and which limits relative rotation between the input shaft 28 and the rotational shaft. Accordingly, when the axis of the input shaft 28 is offset from the axis of the rotational shaft, the elastic deformation of the elastic coupler absorbs the radial force applied to the input shaft 28 from the rotational shaft, and the rotation of the rotational shaft is transmitted to the input shaft 28 without loss. As a result, this prevents early wear and damage to the rotation detector (potentiometer 21), which are caused by radial force applied to the input shaft 28, and improves detection accuracy by eliminating slack between the rotational shaft and the input shaft 28 in the rotational direction.

(2) The elastic member (bushing 29) is fixed to the input shaft 28 and integrally rotates with the input shaft 28. The elastic member is fitted in the coupling hole 31 in the rotational shaft (kingpin 15), and relative rotation between them is prevented. Accordingly, when the axis of the input shaft 28 is misaligned with the axis of the rotational shaft, elastic deformation of the elastic member permits misalignment and limits the rotation relative to the rotational shaft.

(3) The coupling shaft 28a of the input shaft 28 engages the engaging hole 30 of the elastic member (bushing 29), which limits relative rotation. The bushing 29 engages coupling hole 31 of the rotational shaft (kingpin 15), which limits relative rotation. Accordingly, the relative rotation between the input shaft 28 and the bushing 29 and between the bushing 29 and the rotational shaft is mechanically limited, which prevents relative rotation between the rotational shaft and the input shaft. As a result, the rotation of the rotational shaft is transmitted without fail, which improves the reliability and accuracy of the rotation detector.

(4) The coupling hole 31 and the coupling shaft 28a are shaped to prevent rotation relative to the elastic member, respectively. Accordingly, rotation of the rotational shaft is transmitted to the input shaft 28 without attachment by adhesive for a relatively long period.

(5) Since the bushing 29 is made of synthetic rubber, it is easily formed.

(6) The coupling hole 31 is formed to include the columnar large radius hole 31a and the columnar small radius hole 31b. Accordingly, each hole 31a, 31b is formed by one drilling, respectively, which reduces the time spent for manufacturing the coupling hole 31.

(7) Since the tapered portion 15a is formed at the opening edge of the coupling hole 31, the bushing 29 is guided into the coupling hole 31 by the tapered portion 15a when the axis of the input shaft is offset from the axis of the kingpin 15. As a result, installation of the rotation detector is rapid and simple.

Second Embodiment

Figure 6:
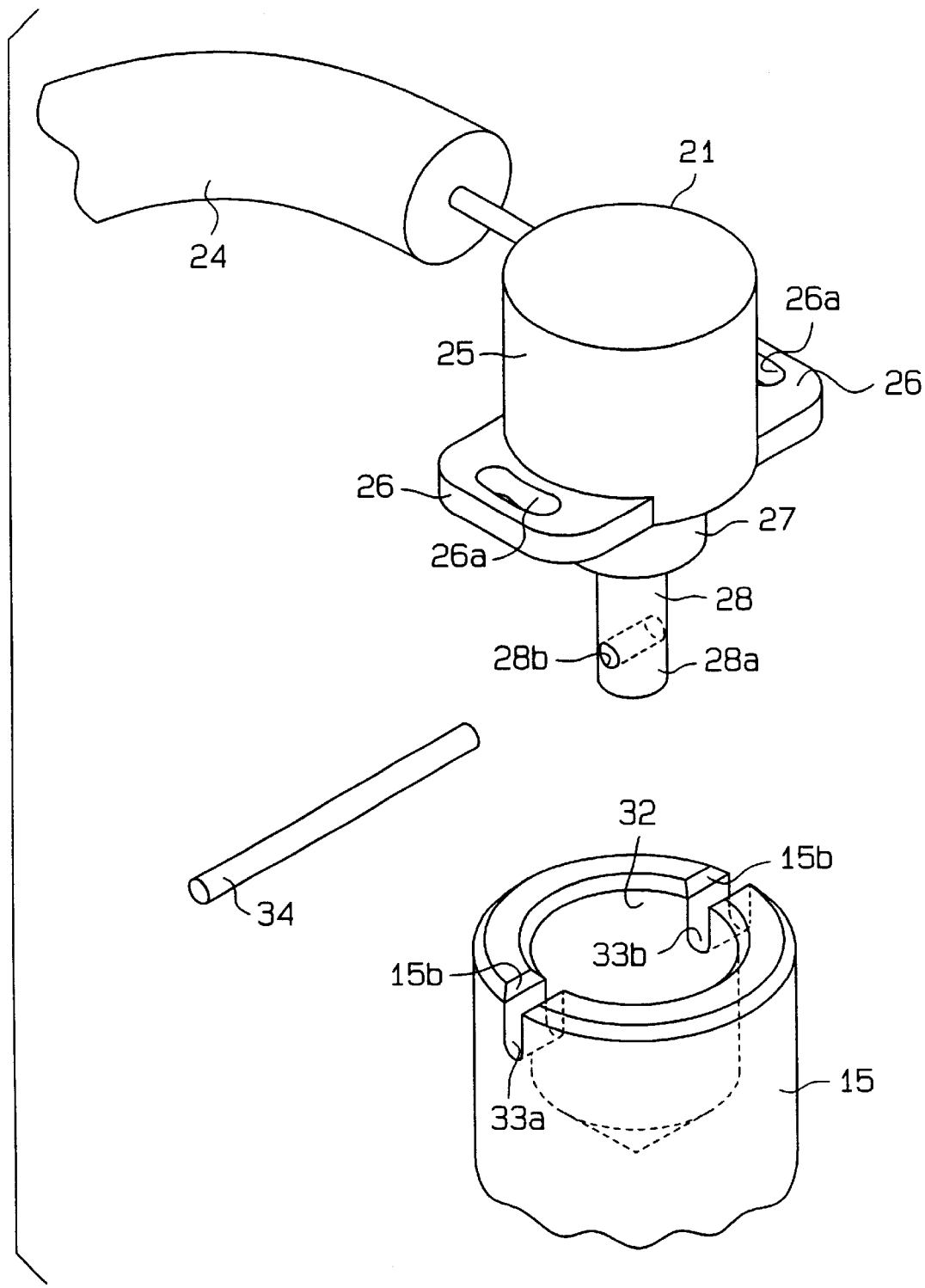
FIG. 6 is a partial exploded perspective view showing a coupler apparatus according to a second embodiment.

A second embodiment of the present invention will now be described with reference to FIGS. 6–8. Since the second embodiment is similar to the first embodiment, similar structures are referred to with similar numerals and a detailed description has been omitted. In FIG. 6, the upper bracket 12 and the support plate 20 are not shown.

Figure 7:
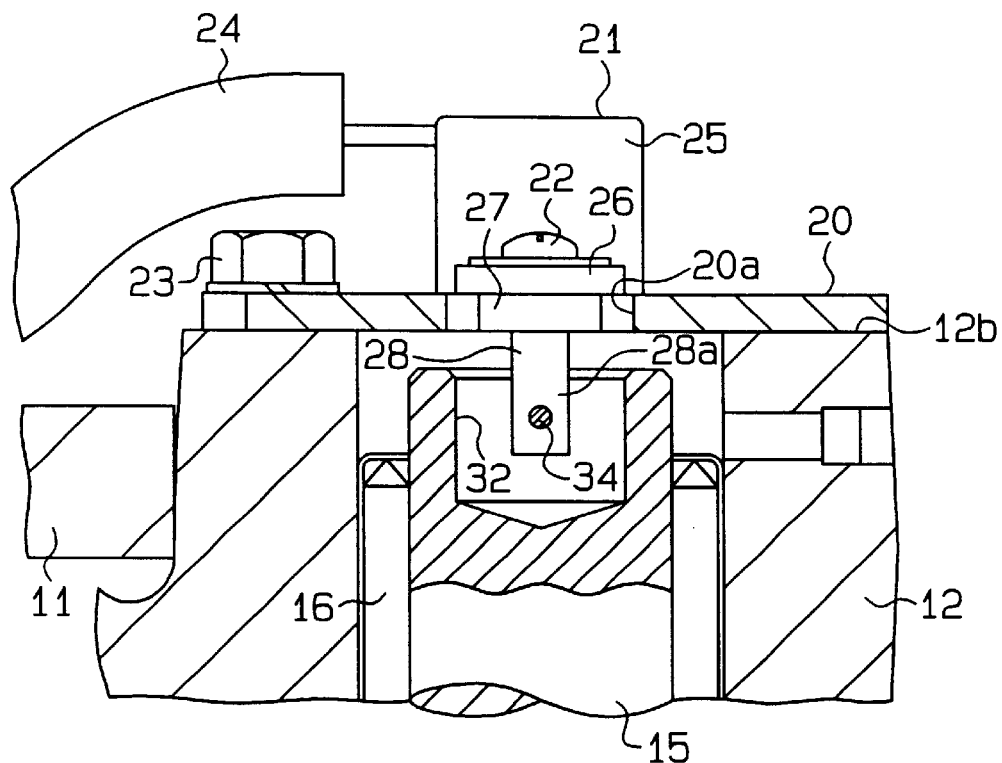
FIG. 7 is a partial cross sectional view showing the coupler apparatus of FIG. 6.

As shown in FIGS. 6 and 7, an input shaft 28 of the potentiometer 21 is different from that of the first embodiment. The cross section of a coupling shaft 28a is circular. A through hole 28b, which is an inserting portion, is formed in the coupling shaft 28a to extend diametrically and to intersect the axis of the coupling shaft 28a.

A coupling hole 32, which is a coupling recess, is formed in the upper end of the kingpin 15. The input shaft 28 is arranged in the center of the coupling hole 32. Engaging grooves 33a, 33b face one another across the axis of the coupling hole 32. The engaging groove 33a is aligned with the engaging groove 33b, and a tapered portion 15b is formed at the top end of each engaging groove 33a, 33b.

Figure 8:
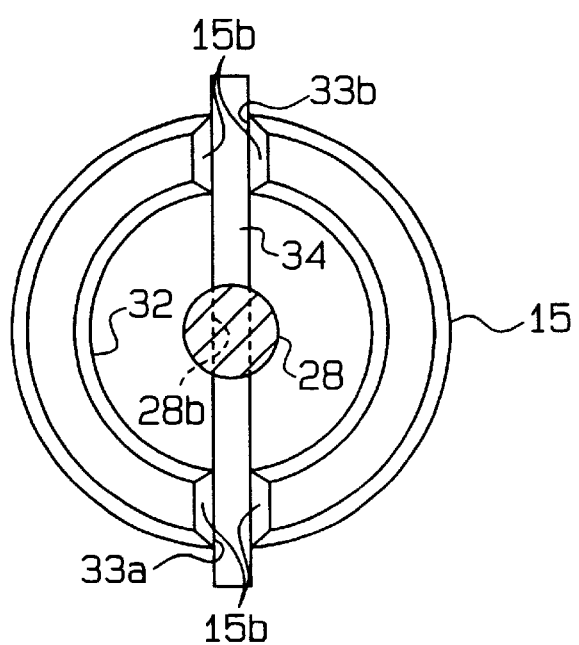
FIG. 8 is a cross sectional and an input shaft of the apparatus of FIG. 6 plan view of a kingpin.

As shown in FIG. 8, a bar spring 34, which is an elastic coupler and a spring member, is received in the through hole 28b of the input shaft 28. Both ends of the bar spring 34 are press fitted in the engaging grooves 33a, 33b. The bar spring 34 is made of piano wire. In this embodiment, the through hole 28b, the engaging grooves 33a, 33b, and the bar spring 34 constitute a rotation transmitting means.

Operation of the installation structure of the illustrated rotation detector will now be described.

Since the coupling hole 32 is columnar, the coupling hole 32 is formed in the kingpin 15 by one step of drilling.

In the installation of the potentiometer 21 to the upper bracket 12, the bar spring 34 that has been engaged with the input shaft 28 through the through hole 28b is engaged with the engaging grooves 33a, 33b of the kingpin 15. In this way, the input shaft 28 is coupled to the kingpin 15 through the bar spring 34 to rotate integrally. Accordingly, the potentiometer 21 is installed to the upper bracket 12 after the bar spring 34 is engaged with the input shaft 28. When the axis of the input shaft 28 is slightly offset from the axis of the kingpin 15 in the installation, the bar spring 34 is guided by the tapered portion 15b into the engaging grooves 33a, 33b, which facilitates installation.

When the input shaft 28 is coaxial with the kingpin 15, the kingpin rotates without applying a bending moment to the input shaft 28, and the rotation is transmitted to the input shaft 28 through the bar spring 34. Accordingly, the potentiometer 21 detects the rotational angle of the kingpin 15.

When the axis of the input shaft is offset from the axis of the kingpin 15 in the longitudinal direction of the bar spring 34, one of the input shaft 28 and the bar spring 34 moves in the longitudinal direction with respect to the other, which permits misalignment between the input shaft and the kingpin 15. When the axis of the input shaft is offset from the axis of the kingpin 15 in a direction perpendicular to the longitudinal direction of the bar spring 34, elastic deformation of the bar spring 34 permits the misalignment between the input shaft 28 and the kingpin 15. At this time, a radial force is applied to the input shaft 28 from the kingpin 15 through the bar spring 34. Accordingly, the radial force applied to the input shaft 28 from the kingpin 15 is absorbed and mitigated by the elastic deformation of the bar spring 34.

When the kingpin 15 rotates in this state, the rotation of the kingpin 15 is transmitted to the input shaft 28 through the deformed bar spring 24. Since the bar spring 34 engages the input shaft 28 and the kingpin 15, the rotation of the kingpin 15 is transmitted to the input shaft without a loss. Accordingly, the potentiometer 21 detects the actual rotational angle of the kingpin 15.

The embodiment of FIGS. 6–8 has the following advantages.

(1) The input shaft 28 is coupled to the rotational shaft (kingpin 15) by the elastic coupler (bar spring 34), which permits the misalignment between the axis of the input shaft 28 and the axis of the rotational shaft by its elastic deformation and limits relative rotation between the input shaft 28 and the rotational shaft. Accordingly, when the axis of the input shaft 28 is offset from the axis of the rotational shaft, the radial force applied to the input shaft 28 from the rotational shaft is absorbed, and rotation of the rotational shaft is transmitted to the input shaft without a loss. As a result, wear and damage to the rotation detector are prevented, which improves the detection accuracy.

(2) The input shaft 28 is located in the coupling hole 32 formed in the rotational shaft (kingpin 15) and is coupled to the center of the spring (bar spring 34) supported in the coupling hole 32. The spring and the input shaft 28 move relative to one another in the longitudinal direction of the spring. Accordingly, since the spring is more durable than an elastic member such as one made of synthetic rubber, the coupling between the rotational shaft and the input shaft is more reliable.

(3) The spring (bar spring 34) passes through the inserting portion (through hole 28b). Accordingly, relative rotation between the input shaft 28 and the rotational shaft is more reliably limited. Only one bar spring 34 is used to couple the input shaft 28 to the kingpin 15, which does not increase the number of parts. Since the bar spring 34 is engaged with the engaging grooves 33a, 33b, the bar spring 34 can be easily replaced.

(4) Since the bar spring 34 is made of piano wire and has a long fatigue limit, it is not easily broken when a load is continuously applied to the bar spring for a long period. This increases the reliability of the bar spring 34. The bar spring resists corrosion, which further increases the reliability of the bar spring 34 against damage.

(5) The tapered portion 15b, which is formed at the upper end of each engaging groove 33a, 33b, guides the bar spring 34 into the engaging grooves 33a, 33b. This facilitates installation of the rotation detector.

Third Embodiment

Figure 9:
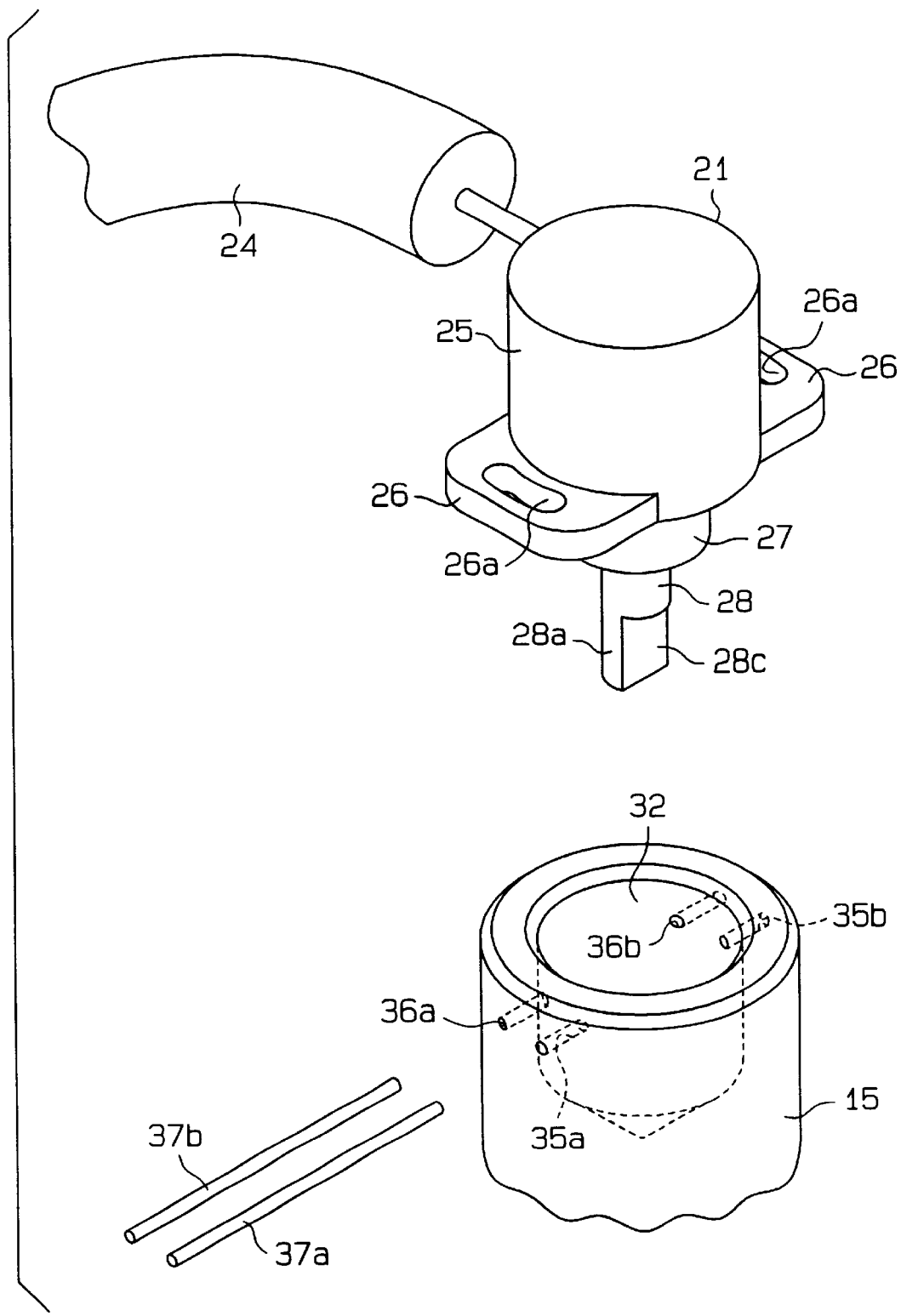
FIG. 9 is a partial exploded perspective view showing a coupler apparatus of a third embodiment.

A third embodiment will now be described with reference to FIGS. 9–11. Since the structure of the potentiometer 21 of the third embodiment is similar to those of the first and second embodiments, the same numerals are used for similar structures, and a detailed description is omitted. In FIG. 9, the upper bracket 12 and the support plate 20 are omitted.

Figure 10:
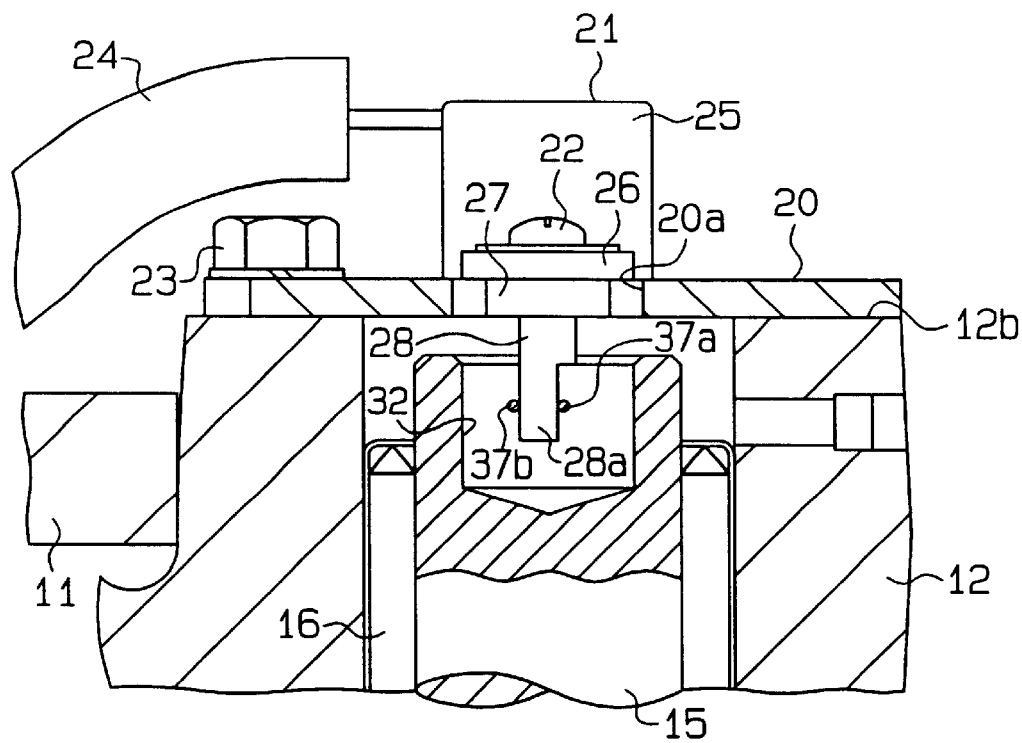
FIG. 10 is a partial cross sectional view showing the coupler apparatus of FIG. 9.

As shown in FIGS. 9 and 10, a coupling shaft 28a similar to that of the first embodiment is formed on an input shaft 28 of a potentiometer 21. That is, a rotation stopper 28c is formed on the coupling shaft 28a. The rotation stopper 28c is formed by partially cutting away the column of the coupling shaft 28a. A coupling hole 32 similar to that of the second embodiment is formed in the upper end of the kingpin 15. Instead of the engaging grooves 33a, 33b of the second embodiment, pairs of engaging holes 35a, 35b and 36a, 36b are provided in the kingpin 15. The engaging holes 35a, 35b, which cause the inner surface of the coupling hole 32 to communicate with the outer surface of the kingpin 15, are vertically aligned and are parallel to a plane including the axis of the kingpin 15. Also, a pair of engaging holes 36a, 36b are aligned and are parallel to the engaging holes 35a, 35b.

Figure 11:
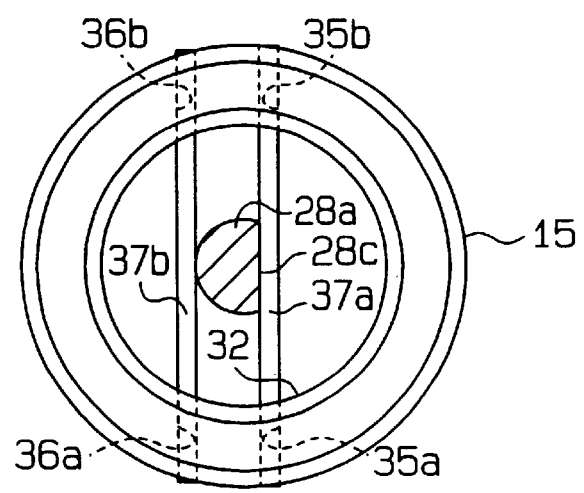
FIG. 11 is a cross sectional and an input shaft of the apparatus of FIG. 9 plan view of a kingpin.

As shown in FIG. 11, a bar spring 37a, which is an elastic coupler and spring, is received in the pair of engaging holes 35a, 35b of the kingpin 15. A bar spring 37b is received in the engaging holes 36a, 36b. Each bar spring 37a, 37b is made of piano wire. The coupling shaft of the input shaft is received between the bar springs 37a, 37b to prevent relative rotation between the coupling shaft 28a of the input shaft 28 and the kingpin 15. In detail, the center portion of the bar spring 37a is pressed against the planar rotation stopper 28c of the coupling shaft 28a, and the center portion of the bar spring 37b is pressed against the other side of the coupling shaft 28a from the rotation stopper 28c. In this embodiment, the coupling shaft 28a, the engaging holes 35a, 35b, 36a, 36b, and the bar springs 37a, 37b constitute a rotation transmitting means.

When installing the potentiometer 21 on the upper bracket 12, first, the bar springs 37a, 37b are inserted in the corresponding engaging holes 35a, 35b, 36a, 36b of the kingpin 15. Then, the coupling shaft 28a is placed between the bar springs 37a, 37b. This couples the input shaft 28 to the kingpin 15 so they integrally rotate with one another through the bar springs 37a, 37b. When the input shaft 28 and the kingpin 15 are coaxial, the kingpin 15 rotates without applying a bending moment to the input shaft 28. The rotation of the kingpin 15 is transmitted to the input shaft 28 through the bar springs 37a, 37b. Accordingly, the potentiometer 21 detects the rotational angle of the kingpin 15.

When the axis of the input shaft 28 is offset from the axis of the kingpin 15 in a longitudinal direction of the bar springs 37a, 37b, misalignment between the input shaft 28 and the kingpin 15 is permitted by the relative movement between the input shaft 28 and the bar springs 37a, 37b. When the axis of the input shaft 28 is offset from the axis of the kingpin 15 in a direction angular to the longitudinal direction of the bar springs 37a, 37b, the elastic deformation of the bar springs 37a, 37b permits the misalignment between the input shaft 28 and the kingpin 15. At this time, a radial force is applied to the input shaft 28 from the kingpin 15 through the deformed bar springs 37a, 37b. However, the radial force from the kingpin 15 to the input shaft is absorbed and mitigated by the elastic deformation of the bar springs 37a, 37b.

When the kingpin 15 rotates in this state, the rotation of the kingpin 15 is transmitted to the input shaft 28 through the deformed bar springs 37a, 37b. Since the bar springs 37a, 37b engage the kingpin 15 and grip the input shaft 28, the rotation of the kingpin 15 is transmitted to the input shaft 28 without loss. Accordingly, the actual rotational angle of the kingpin 15 is detected by the potentiometer 21.

The embodiment of FIG. 9 has the following advantages.

(1) The input shaft 28 is coupled to the rotational shaft (kingpin 15) by the elastic couplers (bar springs 37a, 37b), which permit misalignment between the axis of the input shaft 28 and the axis of the rotational shaft by their elastic deformation and limit relative rotation between the input shaft and the rotational shaft. Accordingly, the simple structure improves the durability and detection accuracy of the rotation detector (potentiometer 21).

(2) As in the second embodiment, the input shaft 28 is arranged in the coupling hole 32 formed in the rotational shaft and is coupled to the center portion of the springs (bar springs 37a, 37b) supported in the coupling hole 32. The rotational shaft (kingpin 15) and the input shaft 28 move in the longitudinal direction of the springs 37a, 37b relative to one another. Since the elastic coupler is formed by the springs 37a, 37b, which are more durable than the rubber elastic members, the reliability of the coupler apparatus is improved.

(3) The coupling shaft 28a of the input shaft 28 is received between the pair of springs (bar springs 37a, 37b) to prevent rotation. Since only the coupling shaft having the rotation stopper 28c is formed, machining is simple. Further, as long as the rotation stopper 28c is formed on the input shaft 28 of the potentiometer 21, a potentiometer 21 that is currently on the market can be used.

(4) The coupling shaft 28a is received between the bar springs 37a, 37b, which are made of a piano wire. Accordingly, the springs 37a, 37b are not easily damaged by application of a continuous load, which increases the reliability of the coupler apparatus. Also, the bar springs resist corrosion, which further increases the reliability of the coupler apparatus.

Fourth Embodiment

A fourth embodiment will now be described with reference to FIGS. 12–14. The differences of the fourth embodiment from the third embodiment are engaging grooves 38a, 38b, 39a, 39b and leaf springs 40a, 40b, which correspond to the engaging holes 35a, 35b, 36a, 36b, and the bar springs 37a, 37b of the third embodiment. Structures similar to those of the third embodiment have the same reference numerals and are not described in detail. Also, in FIG. 12, the upper bracket 12 and the support plate 20 are not shown.

A tapered portion 28d is formed at the distal end of a coupling shaft 28a of an input shaft 28. A pair of engaging grooves 38a, 38b are formed at the opening rim of the coupling hole 32 of the kingpin 15 to communicate the inner wall of the coupling hole 32 to the outer wall of the kingpin 15. The engaging grooves 38a, 38b are horizontally aligned and are parallel to a plane that includes the axis of the kingpin 15. Also, a pair of engaging grooves 39a, 39b are horizontally aligned and are parallel to the pair of the engaging grooves 38a, 38b.

Figure 13:
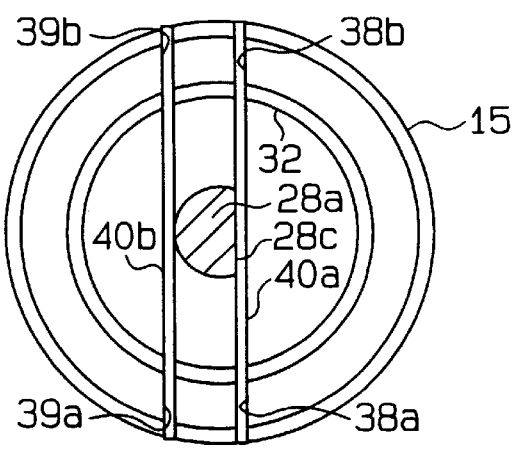
FIG. 13 is a cross sectional and an input shaft of the apparatus of FIG. 12 plan view of a kingpin.

As shown in FIG. 13, a leaf spring 40a, which is an elastic coupler and spring, is press fitted in the pair of the engaging grooves 38a, 38b. Similarly, a leaf spring 40b is press fitted in the pair of engaging grooves 39a, 39b. A coupling shaft 28a is held between the leaf springs 40a, 40b. In detail, a rotation stopper 28c of the coupling shaft 28a is pressed against the center portion of the leaf spring 40a, and the center portion of the leaf spring 40b is pressed against the other side of the coupling shaft 28a from the rotation stopper 28c.

In the present embodiment, the coupling shaft 28a, the engaging grooves 38a, 38b, 39a, 39b, and the leaf springs 40a, 40b constitute a rotation transmitting means.

The installation structure as described above has operation substantially similar to that of the third embodiment.

Accordingly, the present embodiment has the following advantages in addition to the advantages (1)–(3) of the third embodiment.

(1) Since the coupling shaft 28a is held between the leaf springs 40a, 40b, the forces of the springs are easily adjusted by varying the width of the springs without changing the thickness of the springs. Accordingly, the spring force is easily determined only by the spring member without changing the engaging grooves 38a, 38b, 39a, 39b.

(2) When the axis of the input shaft 28 is slightly offset from the axis of the kingpin 15, the tapered portion 28d formed at the lower end of the coupling shaft 28a guides the coupling shaft 28a between the leaf springs 40a, 40b.

Fifth Embodiment

A fifth embodiment will now be described with reference to FIGS. 15–17. The fifth embodiment is basically the same as the first embodiment. The difference is that a bushing 42 having a metal deformation-preventing member 41 is used as an elastic coupler to couple the input shaft 28 to the kingpin 15, instead of the rubber bushing 29. Structures similar to the first embodiment have similar numerals and are not described in detail. In FIG. 17, the upper bracket 12 and the support plate 20 are not shown.

As shown in FIG. 17, a deformation-preventing member 41 is arranged to correspond to an engaging hole 30 of a bushing 42. The deformation-preventing member 41 is formed of a hard metal sheet (stainless steel sheet in this embodiment). The cross section of the deformation-preventing member is D-shaped. The deformation-preventing member 41 includes a flat portion 41a and a pair of curved portions 41b extending from both ends of the flat portion 41a. A slit 43 is formed between the distal ends of the curved portions 41b. The length of the deformation-preventing member 41 is the same as that of a body 42a of the bushing 42. The outer wall of the deformation preventing member 41 is secured to the inner wall of a hole 42b formed in the body 42a. The inner wall of the deformation preventing member 41 forms an engaging hole 30. In this embodiment, the deformation preventing member 41 is molded in the body 42a by insert molding during formation of the body 42a.

The wall thickness of the deformation preventing member 41 is 1 mm or smaller. The inner diameter of the deformation preventing member 41 is slightly smaller than the outer diameter of the coupling shaft 28a. When the coupling shaft 28a is inserted, the curved portions are opened and engage the coupling shaft 28a. A tapered portion 28d is formed at the distal end of the coupling shaft 28a.

Differences of operation and advantage compared to the first embodiment will now be described. In the first embodiment, the input shaft 28 is coupled to the bushing 29 with the coupling shaft 28a engaged with the engaging hole 30 in the bushing 29. If the rubber of the bushing 29 is too hard, it cannot absorb the misalignment of the axes of the input shaft 28 and the kingpin 15. The upper limit hardness of the rubber is 80.

The torque transmitted between the bushing 29 and the input shaft 28 is strongly applied to the force-receiving surface of the D-shaped engaging holes 30. Since the rubber hardness is low, when the rotational direction of the kingpin 15 changes, hysteresis occurs due to compression of the material. For example, as shown in FIG. 16, when the clockwise rotation changes to a counterclockwise rotation, hysteresis occurs. That is, even when the kingpin 15 is coaxial with the input shaft 28, torsion occurs between the bushing 29 and the input shaft 28. When the change of rotational direction is repeated, hysteresis increases as the bushing 29 is worn.

On the other hand, in this embodiment, since the deformation preventing member 41 is attached to the rubber of the body 42a by fusion, the torque transmitted between the bushing 42 and the input shaft 28 is received by the entire attached surface between the deformation preventing member 41 and the rubber, thus reducing the deformation of the rubber by torsion. Accordingly, the bushing 42 can withstand repetitive change of the rotational direction.

When the deformation preventing member is formed without a slit 43, installation is difficult unless the outer diameter of the coupling shaft 28a is smaller than the inner diameter of the deformation preventing member 41. If the outer diameter of the coupling shaft 28a is reduced, slack, or play, will exist between the deformation preventing member 41 and the coupling shaft 28a. However, in this embodiment, a slit 43 is formed in the deformation preventing member 41, and the inner diameter of the deformation preventing member 41 is smaller than the outer diameter of the coupling shaft 28a before the installation of the input shaft 28. Since the coupling shaft 28a is inserted in the engaging hole 30 with the tapered portion 28d pushing open the deformation preventing member 41, the input shaft is installed in the bushing without slack. Also, since the deformation preventing member 41 is formed by a stainless steel sheet, the forming process is simpler. Further, the member 41 resists corrosion, which improves the durability of the coupler apparatus.

The present invention is not limited to any of the above embodiments and can further be varied as follows.

Figure 18:
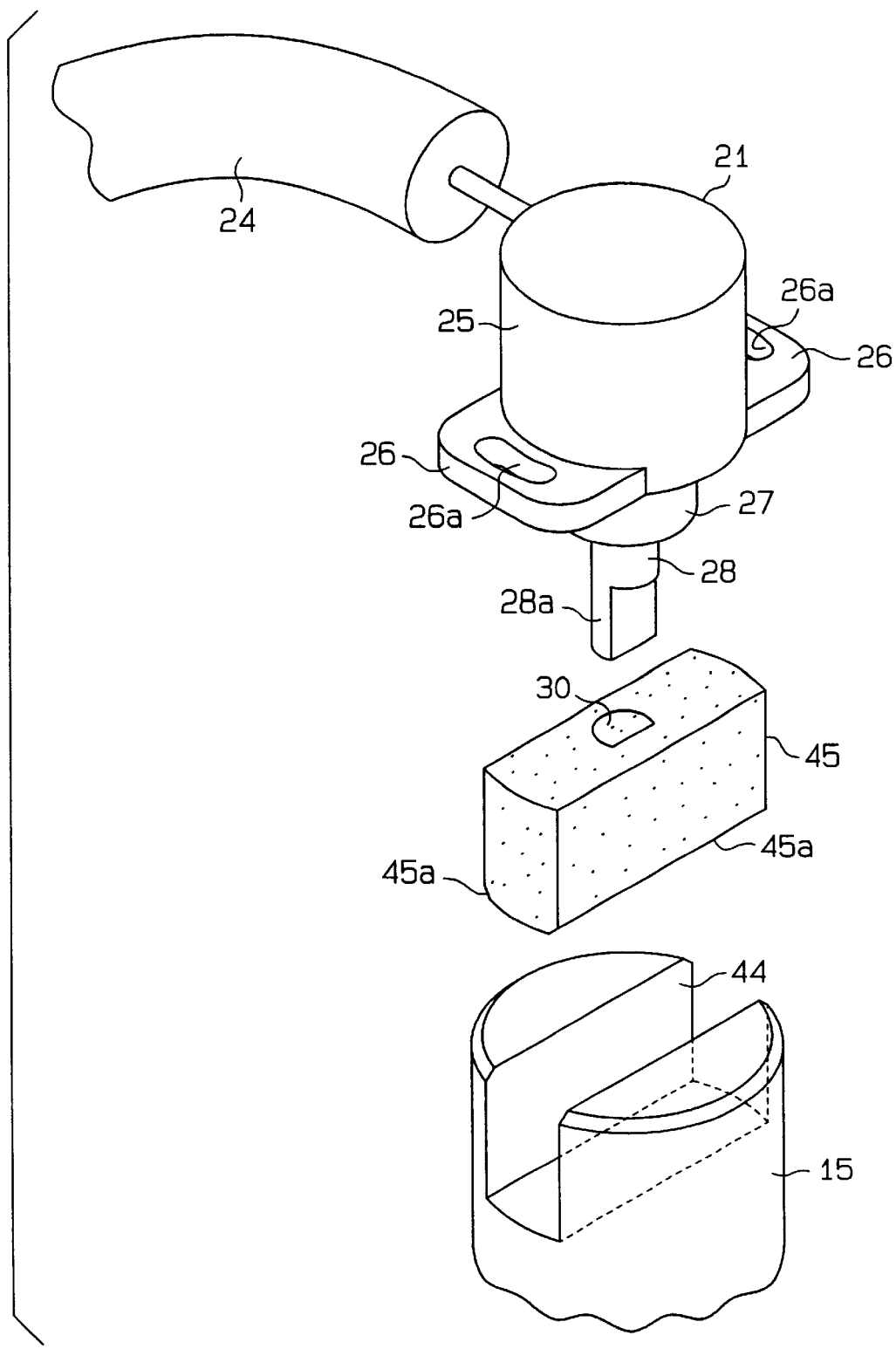
FIG. 18 is a partial exploded perspective view showing a coupler apparatus according to a further embodiment.

(1) In a further embodiment as shown in FIG. 18, an engaging groove 44, which is a coupling recess, is formed in the upper end of the rotational shaft (kingpin 15). A bushing 45, which is attached to the coupling shaft 28a of the input shaft 28, engages the engaging groove 44. In this structure, the engaging groove 44 is formed in the rotational shaft, which facilitates machining the rotational shaft. The efficiency of installation is improved by forming a tapered portion 45a at the lower end of the bushing 45. In this structure, a deformation preventing member 41 may be built in the engaging hole 30, as in the fifth embodiment.

Figure 19:
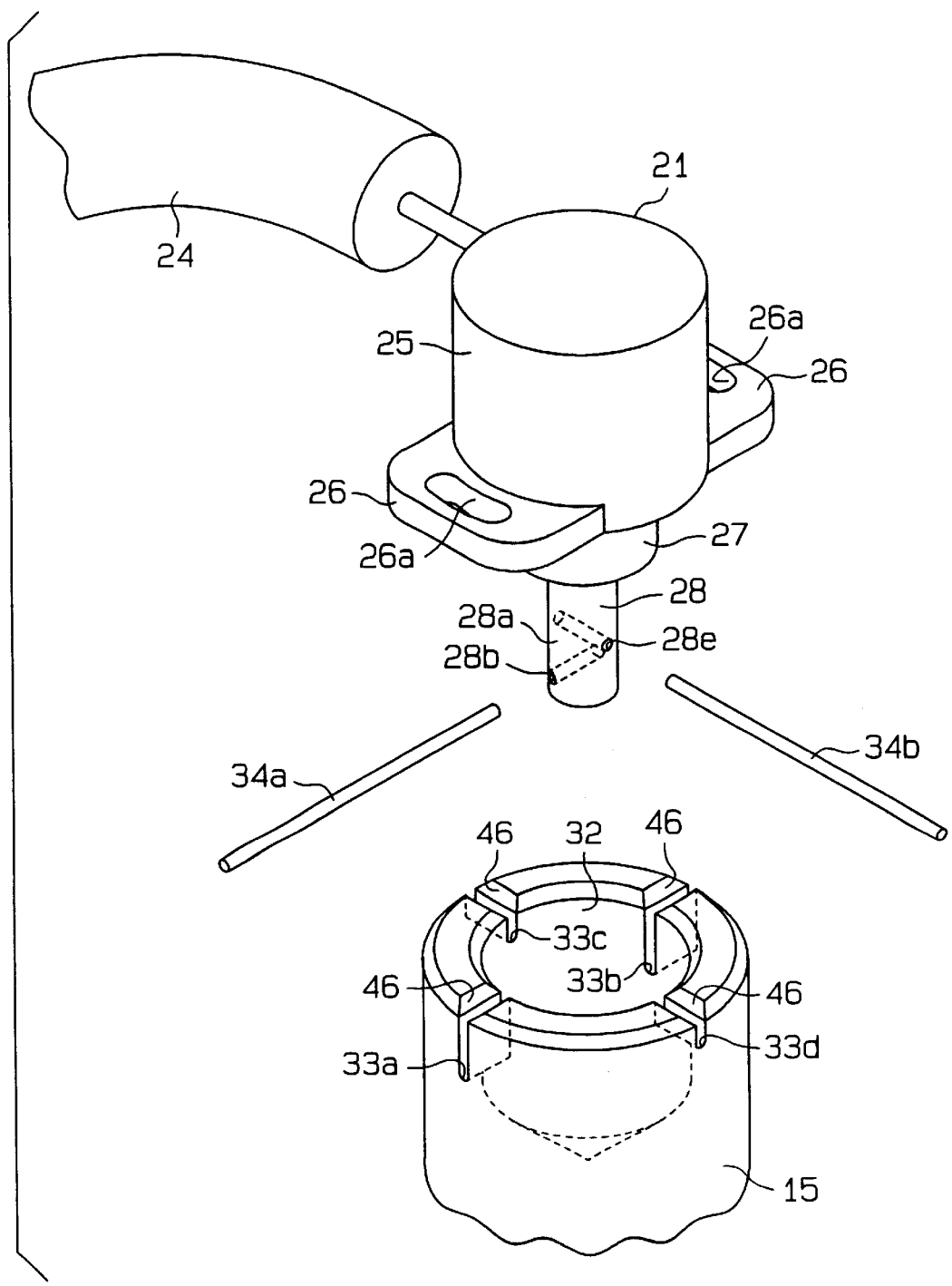
FIG. 19 is a partial exploded perspective view showing a coupler apparatus according to another embodiment.

(2) In a further embodiment, as shown in FIG. 19, another through hole 28e may be formed in the coupling shaft 28a of the input shaft 28 in addition to the through hole 28b. The through hole 28e, which extends horizontally, is vertically offset from and perpendicular to the through hole 28b. Pairs of engaging grooves 33a, 33b, and 33c, 33d are formed in the rotational shaft (kingpin 15) at right angles. Bar springs 34a, 34b are respectively inserted in the through holes 28b, 28e and are respectively press fitted in the engaging holes 33a, 33b and 33c, 33d. In this structure, since the input shaft 28 is connected to the rotational shaft by the perpendicular bar springs 34a, 34b, the movement of each spring in its longitudinal direction is limited. This increases detection accuracy and reliability. Here, if a tapered portion 46 is formed at the upper end of each engaging groove 33a–33d, installation is facilitated.

(3) In a further embodiment, a pair of engaging holes may be provided in the rotational shaft (kingpin 15) instead of the engaging grooves 33a, 33b, and an engaging groove instead of the through hole 28b may formed in the coupling shaft 28a of the input shaft 28. Then, the input shaft 28 may be coupled to the rotational shaft by engaging the engaging groove with the bar spring 34, which has been inserted in the pair of engaging holes in advance.

Also, an engaging groove may be formed in the input shaft in addition to forming engaging grooves in the rotational shaft. The rotational shaft may be coupled to the input shaft 28 by engaging the bar spring 34 with the engaging grooves.

Figure 20:
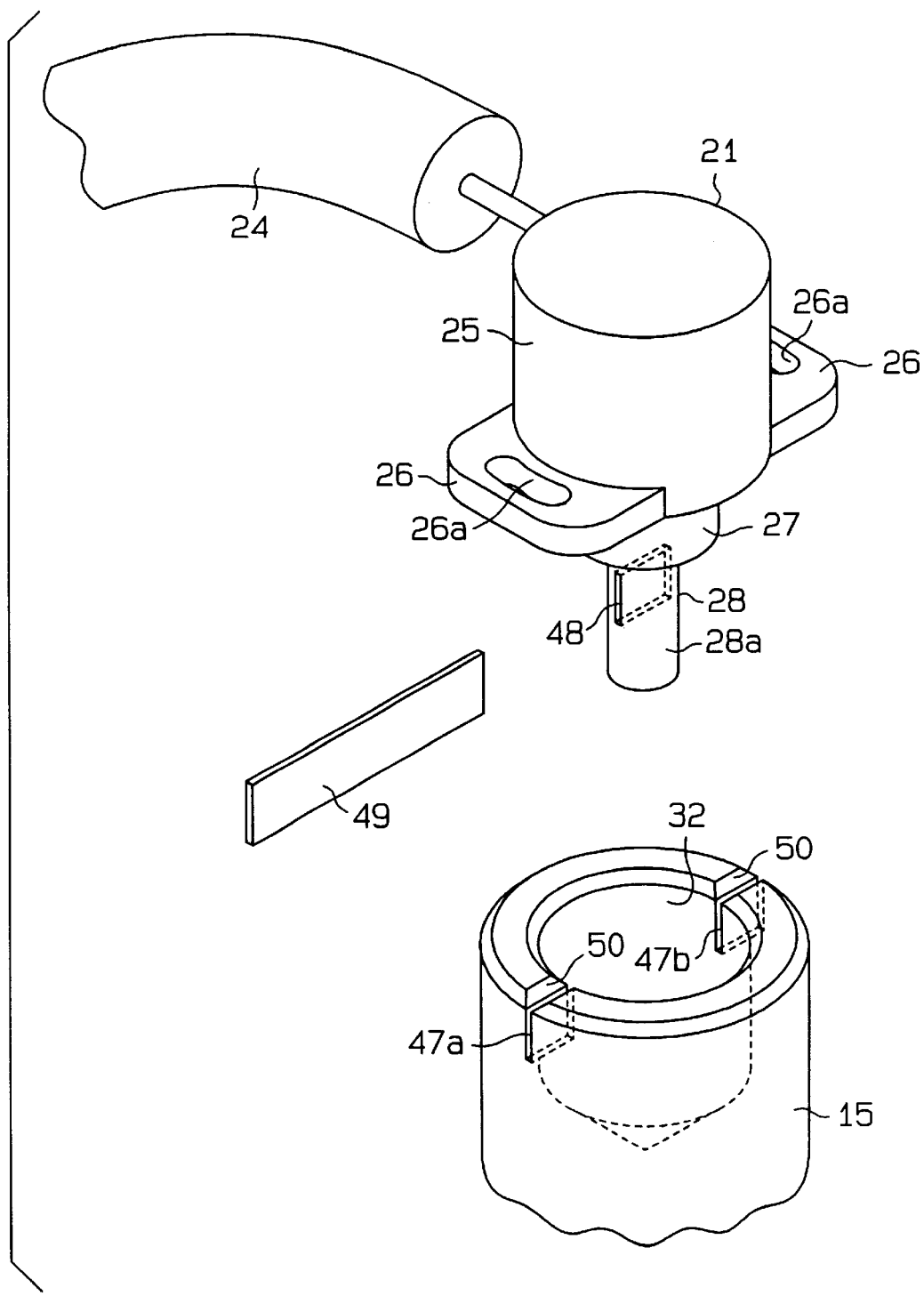
FIG. 20 is a partial exploded perspective view showing a coupler apparatus according to another embodiment.
Figure 21:
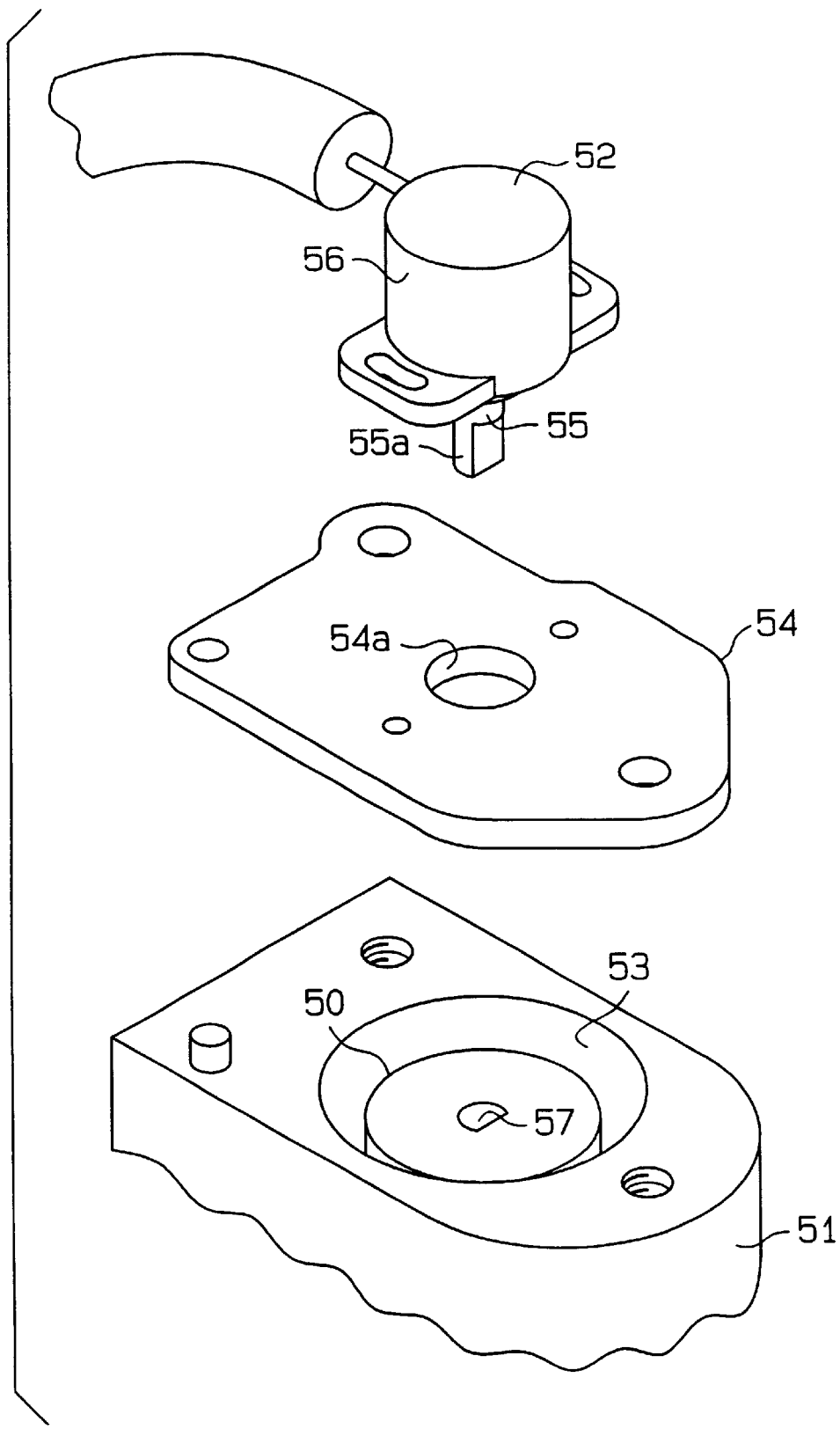
FIG. 21 is a partial exploded perspective view showing a coupling according to a prior art example.

(4) In a further embodiment, as shown in FIG. 20, only a pair of engaging grooves 47a, 47b are aligned to pass through the axis of the kingpin 15. A slit-shaped through hole 48 is formed in the coupling shaft 28a of the input shaft 28. A leaf spring 49 engages the through hole 48 and is press fitted in the engaging grooves 47a, 47b. In this structure, only one leaf spring is required, which reduces parts and installation work. Installation is facilitated by forming a tapered portion 50 on the upper end of each engaging groove 47a, 47b.

Instead of the through hole 48, an engaging grove may be formed in the input shaft 28.

(5) The material of each spring is not limited to metal and may include other nonmetals such as highly elastic plastic (6) The material of the elastic member (bushing 29) is not limited to synthetic rubber and may be another elastic material such as natural rubber or high elasticity plastic.

(7) The cross-sectional shape of the coupling shaft 28a is not limited to a D-shape and may be a regular triangle, a rectangle, or an ellipse. In the fifth embodiment, the shape of the deformation preventing member 41 must correspond to the cross-sectional shape of the coupling shaft 28a.

(8) The cross-sectional shape of the bar springs 34, 34a, 34b, 37a, 37b is not limited to a circle and may be other shapes such as a square or an ellipse.

(9) The shape of the coupling hole 31 and the elastic member (bushing 29) is not limited to the combination of columnar portions and may be simply columnar. In this case, the contact surfaces of the elastic member and the coupling hole 31 must be attached by adhesive or by a bolt to prevent relative rotation between the elastic member and the coupling hole 31 or between the elastic member and the input shaft 28.

The shape of the coupling hole 31 and the elastic member may be other shapes such as a rectangular parallelepiped, a cube, or an oblong column.

(10) A coupling hole may be provided in the input shaft 28 and a coupling shaft, which extends from the rotational shaft, may be located in the coupling hole. The coupling hole may be coupled to the coupling shaft through an elastic coupler.

(11) A tapered portion for guiding the elastic member (bushing 29) into the coupling hole 31 may be formed at the lower end of the elastic member. Alternately, the tapered portion may be formed both at the upper end of the coupling hole 31 and at the lower end of the coupling member. In this structure, the elastic coupler is also guided into the coupling hole 31, which facilitates installation of the rotation detector.

(12) Instead of fixing each spring by press fitting, it may be fixed by bending its ends at the peripheral surface of the rotational shaft. Alternately, the ends may be fixed by adhesive.

(13) The present invention is not limited to the coupler apparatus of a rotation detector (potentiometer 21) that is installed on the support plate (upper bracket 12) to detect the rotation of the rotational shaft (kingpin 15). The present invention may be embodied in a coupler apparatus of a rotation detector located on the upper beam 11 to detect the rotation of the bell crank pin 4 of a forklift, the bell crank pin 4 of which integrally rotates with the bell crank 3.

Also, the present invention may be embodied in a coupler apparatus of a rotation detector located in the steering rods 5, 6 to detect the rotation of the rotational pins 9a, 9b relative to the steering rods 5, 6. Further, the present invention may be embodied in a coupler apparatus of a rotation detector located in the steering rods 5, 6 to detect the rotation of the rotational pins 10a, 10brelative to the steering rods 5, 6.

Furthermore, the present invention may be embodied in a coupler apparatus of a rotation detector that detects rotation amount without detecting the steering angle.

(14) In FIGS. 9–11, leaf springs may be used instead of the bar springs 37a, 37b.

Figure 12:
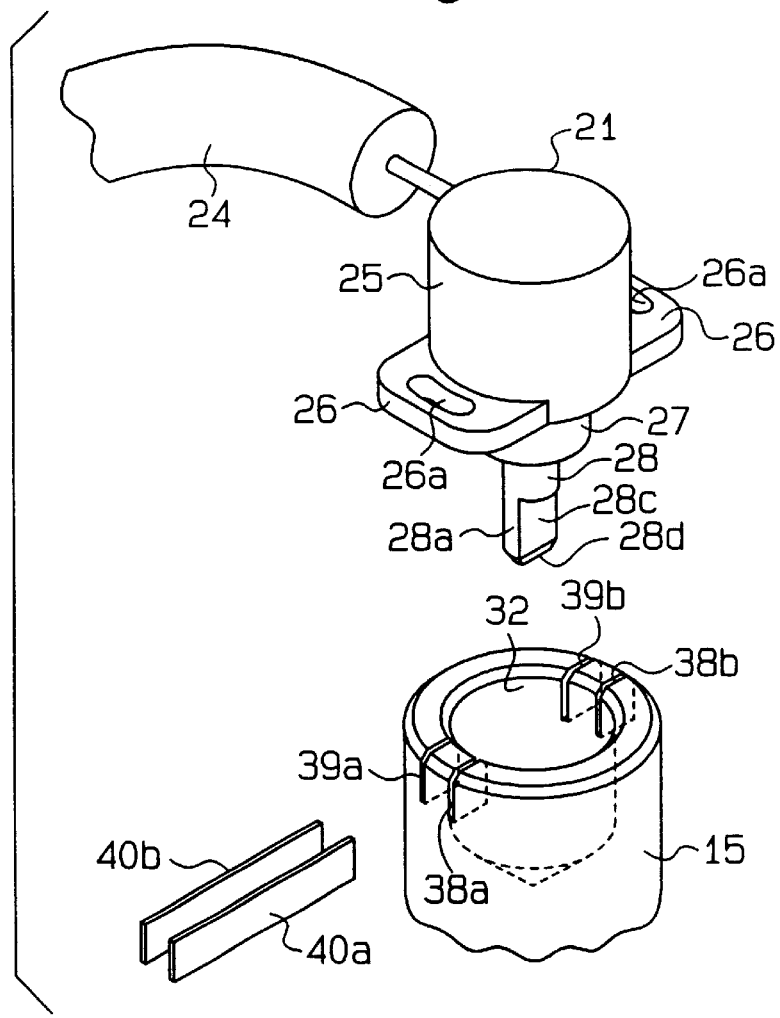
FIG. 12 is a partial exploded perspective view showing a coupler apparatus according to a fourth embodiment.
Figure 14:
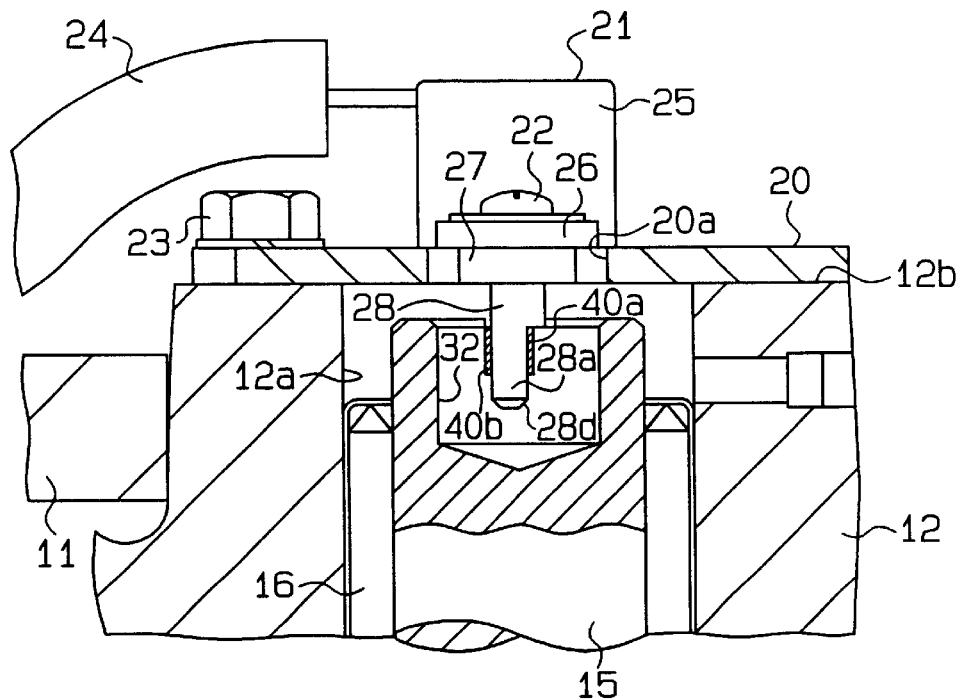
FIG. 14 is a partial cross sectional view showing the coupler apparatus of FIG. 12.

(15) In FIGS. 12–14, bar springs may be used instead of the leaf springs 40a, 40b.

Figure 15:
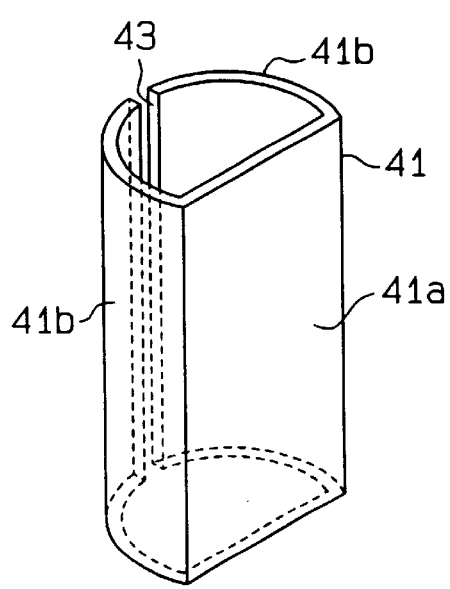
FIG. 15 is a perspective view of a deformation preventing member that is used in a fifth embodiment.
Figure 16:
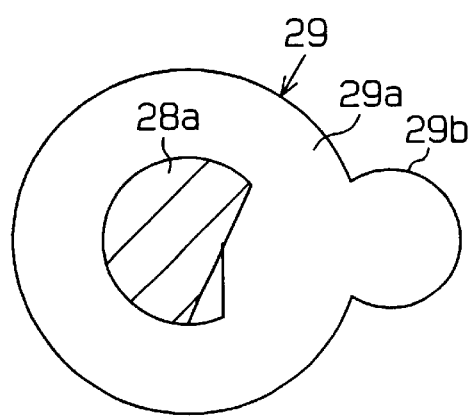
FIG. 16 is a diagrammatic cross sectional view showing an output shaft and an elastic member.
Figure 17:
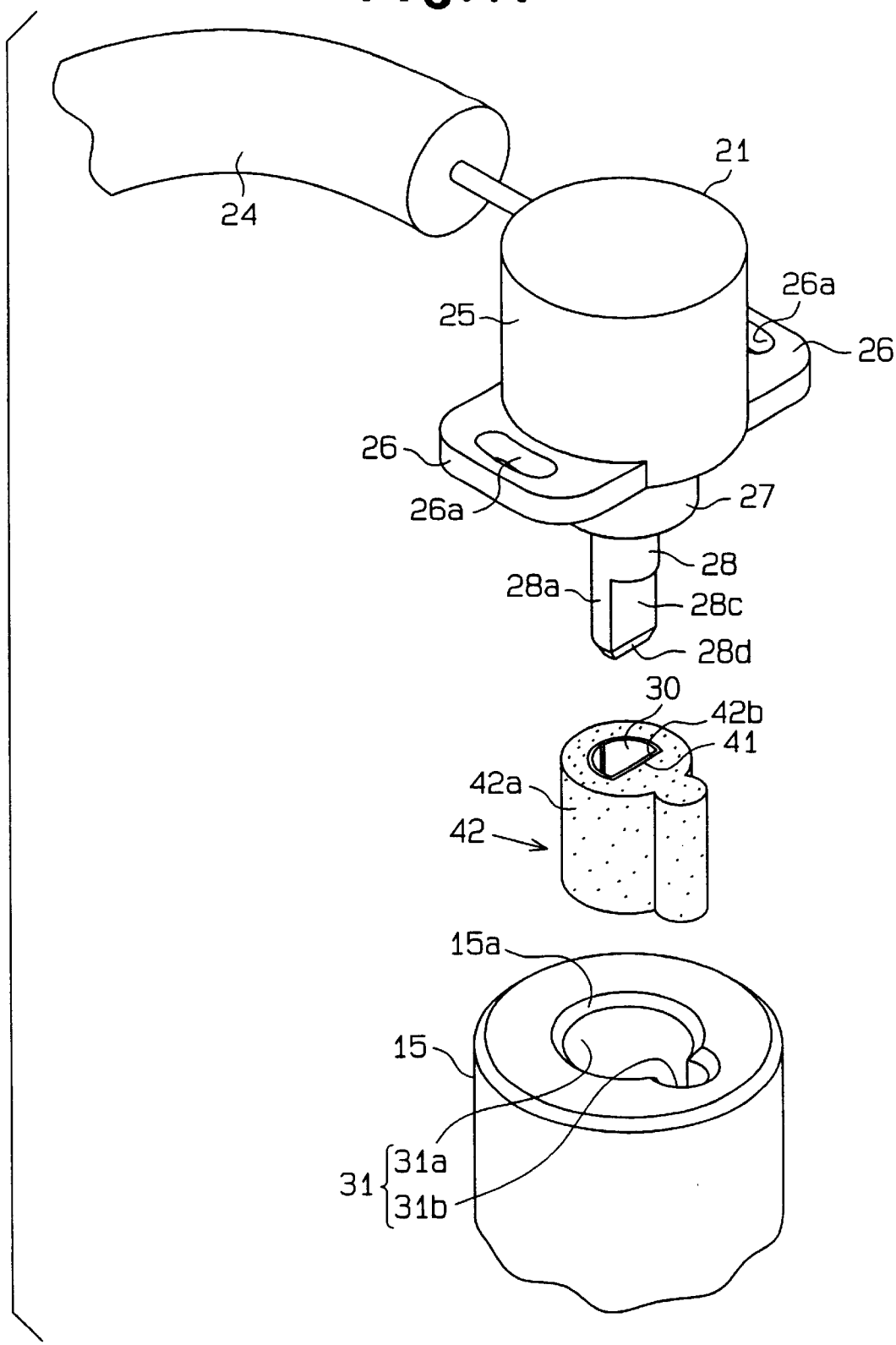
FIG. 17 is a partial exploded perspective view showing a coupler apparatus according to a fifth embodiment.

(16) In FIGS. 15–17, instead of molding the deformation preventing member 41 with the bushing 42 by insert molding, the deformation preventing member 41 may be attached to the body 42a with an adhesive. Also, a cylindrical deformation preventing member having no slit 43 may be used. In this case, to prevent slack, the inner diameter of the deformation preventing member 41 and the outer diameter of the coupling shaft 28a must be accurate.

(17) Other than stainless steel, the deformation preventing member 41 may be made of any hard material, such as steel, copper, aluminum alloy, or nonmetal material such as a hard plastic.

(18) The rotation detector is not limited to the potentiometer 21 and may be a rotation differential transformer, which is an analogs type detector. Also, the rotation detector may be a digital type detector such as an encoder, a magnetic rotation detector or a resolver.

(19) The present invention is not limited to forklifts and may be embodied in other industrial vehicles such as highlift vehicles or cranes. The present invention may also be embodied in carrier vehicles such as trucks, buses or passenger vehicles such as sedans.

What is claimed is:

1. A coupler apparatus for coupling an input shaft of a rotation detector to an operating shaft, wherein one of the input shaft and the operating shaft is a first shaft and the other of the input shaft and the operating shaft is a second shaft, the apparatus comprising;

a recess formed in an end of the first shaft;

a hollow sleeve for receiving the second shaft; and an elastic coupling member fitted in the recess, wherein a hole is formed in the elastic coupling member, the sleeve is fitted in the hole, the elastic coupling member is not as hard as the sleeve, and the elastic coupling member and the sleeve limit relative rotation between the shafts.

2. The coupler apparatus according to claim 1, wherein the elastic coupling member is shaped like the union of two joined cylinders, the axes of which are parallel, and wherein the shape of the elastic coupling member conforms to the shape of the recess.

3. The coupler apparatus according to claim 1, wherein a distal end of the second shaft has a D-shaped cross-section, and the sleeve includes a D-shaped hole for receiving the second shaft.

4. The coupler apparatus according to claim 3, wherein the sleeve is insert molded to the elastic coupling member.

5. The coupler apparatus according to claim 4, wherein the sleeve has a wall and the thickness of the wall is uniform.

6. The coupler apparatus according to claim 4, wherein the sleeve includes a longitudinal slit that extends in the axial direction and both ends of the slit are open.

7. The coupler apparatus according to claim 6, wherein the sleeve is made of stainless steel.

8. The coupler apparatus according to claim 2, wherein the coupling member is made of rubber.

9. A coupler apparatus for coupling an input shaft of a rotation detector to an operating shaft for rotating the input shaft, wherein one of the input shaft and the operating shaft is a first shaft and the other of the input shaft and the operating shaft is a second shaft, the coupler apparatus comprising:

a recess formed in an end of the first shaft and accommodating an end of the second shaft; and a spring that is transverse to the axes of the first and second shafts, wherein opposing ends of the spring engage the first shaft and a mid-section of the spring engages the second shaft so that the spring compensates for misalignment of the axes of the first and the second shafts and limits relative rotation between the first and the second shafts.

10. The coupler apparatus according to claim 9, wherein the spring is fitted in a through hole provided in the second shaft.

11. The coupler apparatus according to claim 10, wherein the spring includes a rod or a wire having a circular cross-sectional area.

12. The coupler apparatus according to claim 11, wherein the spring is perpendicular to the axis of the second shaft.

13. The coupler apparatus according to claim 11, wherein the spring is a first spring and the coupler apparatus further comprises a second spring, the first spring being spaced from the second spring along an axis of the second shaft and the first and the second springs being perpendicular with respect to each other.

14. The coupler apparatus according to claim 11, wherein the spring is a first spring and the coupler apparatus further comprises a second spring, the first and the second springs being parallel with respect to each other.

15. The coupler apparatus according to claim 9, wherein the spring is fitted into grooves that are formed in an end of the second shaft.

16. The coupler apparatus according to claim 15, wherein:

the spring includes a first spring and the coupler apparatus includes a second spring;

the first and the second springs are parallel with respect to each other;

an engaging end of the first shaft has a D-shaped cross-section; and the first shaft is located between the first and the second springs so that a flat side of the D-shaped cross-section engages one of the first and the second springs and a curved side of the D-shaped cross-section engages the other of the first and the second springs.

17. The coupler apparatus according to claim 16, wherein the first and the second springs each include a rod or a wire having a circular cross-sectional area.

18. The coupler apparatus according to claim 16, wherein the spring member includes a flat leaf spring and a longitudinal axis of the leaf spring is perpendicular to an axis of the second shaft.

* * * * *